United States Patent Office 3,004,292
Patented Oct. 17, 1961

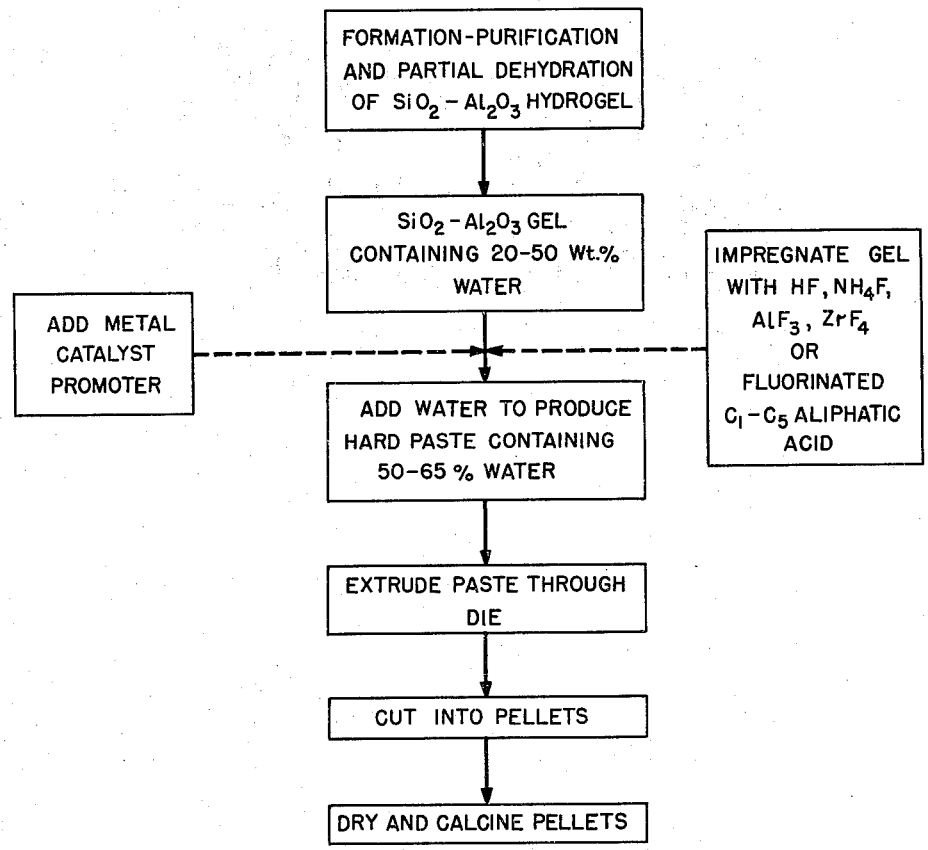
INVENTORS
HILLIS O. FOLKINS
BY KENNETH E. LUCAS
ATTORNEY

3,004,292
EXTRUSION OF SILICA-ALUMINA HYDROGEL
Hillis O. Folkins and Kenneth E. Lucas, Crystal Lake, Ill., assignors to The Pure Oil Company, Chicago, Ill., a corporation of Ohio
Filed Nov. 19, 1958, Ser. No. 774,916
6 Claims. (Cl. 18—47.5)

This invention relates to new and useful improvements in processes for the preparation and extrusion of silica-alumina catalyst supports.

In the past, silica-alumina catalysts or catalyst supports have been prepared by various precipitation methods in which silica and alumina are combined to form a silica-alumina hydrogel. The gel is then ion-exchanged, washed, dried, calcined and formed into the desired physical shape by certain sequential procedures. For fluid catalytic beds, the catalyst may be ground into a powder but more frequently it is formed into microspheres by spray-drying. The latter method is generally employed in the production of commercial, fluid-type, cracking catalysts.

In many applications, however, it is necessary to use the silica-alumina support in the forms of pills, pellets, or tablets. As a practical matter, it has proved very difficult to form satisfactory pellets of desired size without the use of a binding agent which may interfere with the catalytic acitvity of the support. As a result, there have been numerous procedures propposed for forming silica-alumina hydrogels into pellets for use as catalyst supports. The formation of silica-alumina hydrogels into pellets is difficult because of the high degree of abrasiveness and glass-like structure of materials containing more than 50% silica. One procedure which has been investigated for the formation of small pellets has been an extrusion process whereby the silica-alumina is extruded through a small die and the spaghetti-shaped product cut into small pellets. While the need for a satisfactory extrusion process has been recognized by the prior art, no satisfactory process has been proposed for extrusion of acidic, silica-alumina catalyst supports containing 70-90% silica. These high-silica compositions are very hard and abrasive when dried and have proved extremely difficult to extrude or otherwise form into pellets. While there has been some success with extrusion of soft, newly-formed silica-alumina hydrogels containing a high water content, no satisfactory procedure has been proposed for extrusion of dried or powdered silica-alumina or silica-alumina microspheres.

It is therefore one object of this invention to provide a new and improved process for the extrusion of silica-alumina catalyst supports containing 70-90% silica (dry basis).

Another object of this invention is to provide an improved process for extruding silica-alumina which has been dried, and powdered or formed inot microspheres, so that the extruded material may be cut into very small pellets which are coherent and resistant to fracturing or powdering.

A feature of this invention is the provision of an improved process for extrusion of silica-alumina catalyst supports, containing 70-90% silica (dry basis), by maintaining the water content of the support within critical limits at all stages prior to and during the extrusion.

A further feature of this invention is the provision of an improved process for extrusion of silica-alumina catalyst supports, containing 70-90% silica (dry basis), starting with a dried or powdered silica-alumina in which a small amount of a fluorine-containing compound is incorporated in the material prior to extrusion.

Other objects and features of this invention will become apparent from time to time throughout the specification and claims as hereinafter related.

In the accompanying drawing, to be taken as a part of this specification, the figure shown is a flow diagram of a preferred embodiment of this process.

This invention is based upon our discovery that high-surface-area silica-alumina, containing 70-90% silica (dry basis), may be extruded and cut into small pellets which are satisfactory for use as catalysts or catalyst supports if the extrusion is carried out at a certain step in the thermal processing of the catalyst or support. In our invention, the water content of the support or catalyst hydrogel is never, in the course of its preparation, reduced below a certain level prior to extrusion. The minimum water content is about 20% w. water and preferably 25% or above. For satisfactory extrusion, therefore, it is necessary that the dried hydrogel, prior to extrusion, have a water content of 20-50% w. water. Dependent upon the composition and the particular screw-extrusion apparatus, the water content of the silica-alumina at the time of extrusion must be between 50 and 65% w. The water content required for satisfactory extrusion varies in proportion to the amount of silicia in the support. Thus, a silica-alumina, containing about 70% w. silica, will require about 50-55% w. water, while a silica-alumina containing 90% w. silica will require about 65% w. water. Throughout the specification and claims, the percentage of water in the silica-alumina is expressed as a percentage of the total composition rather than as a percentage of the dry weight of silica-alumina.

In our invention, several general methods of catalyst preparation may be used. Firstly, a silica-alumina hydrogel which has been dried to 20-50% w. water is used as the starting material for this extrusion process. This hydrogel may be a solid mass or may be powdered or formed into microspheres having 20-50% w. water content dependent upon the degree of drying. This silica-alumina is mixed with sufficient water to provide a water content in the range of 50-65% w. to produce a paste having a consistency satisfactory for extrusion through a screw-type extruder or rotary pellet mill. The silica-alumina paste is then extruded through a die and cut into short lengths to provide small catalyst pellets. The catalyst pellets are dried and calcined and may be used in that form in applications which require only the silica-alumina composition.

The catalysts or catalyst support which are produced by the extrusion process which constitutes this invention may be used as cracking catalysts for fixed or moving beds or as catalysts, per se, in other reactions wherein this composition affords appropriate activity and selectivity. More generally, however, these catalyst supports, as formed by the process of this invention, are used in conjunction with certain metals or metal oxides as promoters to form finished particulate catalysts for effecting reactions such as isomerization, hydrogenation, and reforming of petroleum hydrocarbons. Promoters which may be added to these catalyst supports are preferably group VIII metals, such as platinum, palladium, rhodium, nickel, cobalt, etc., and transition metal oxides of group VI, such as those of chromium, molybdenum and tungsten. The amount of promoter added to make the final catalyst composition varies according to the end use of the catalyst, and upon the specific promoter added, and embraces a range of approximately 0.05 to 10 weight percent of the final catalyst. Generally, the metal oxides are added in the higher concentration range while metals, and particularly metals of the platinum type, are added in concentrations of one percent or less. Catalysts particularly effective for the isomerization of n-paraffins and having good physical characteristics, are those in which palladium, platinum, and rhodium are added in concentrations of 0.05 to 1.0 weight percent. These metal promoters are preferably added to the hydrogel at a point in the process prior to extrusion. Thus, the metal promoter may be added to the solutions from which silica and alumina are precipitated, and precipitated at this point; or, the metal promoter may be precipitated on the already-formed and purified silica-alumina hydrogel; or, the metal promoter may be added as a solution of a soluble metal compound to the purified silica-alumina hydrogel, followed by drying of the mass to the desired water level. As an alternate method, the metal may be added by impregnation of the already-extruded and calcined silica-alumina support.

As an alternate procedure, formed microspheres are dried or powdered silica-alumina hydrogels having 20–50% w. water content are impregnated with an aqueous solution of a salt of the desired metal promoter. The resulting mass may have a water content of around 60% w. The water content of this mass is then adjusted to a value between 50 and 65% w. which is appropriate for the particular composition and extrusion apparatus used, and the mixture is extruded through a small die. The spaghetti-shaped extrudate is cut into short lengths to provide small catalyst pellets which are dried and treated with hydrogen at 975° F. to reduce the metal salt to a highly active form. Or, the soluble metal salt of the desired metal promoter may be incorporated in, or precipitated on or with, the silica-alumina hydrogel in the initial precipitation of the gel from aqueous solution. Depending upon the procedure employed, the silica-alumina hydrogel may be ion-exchanged and washed to remove objectionable salts before or after the addition of the metal promoter component. The slurry thus freed of undesired ions is filtered and dried to a water content of 20–50% w. for storage. The dried hydrogel is subsequently provided with sufficient water to provide a water content of 50–65% w., sufficient to produce a silica-alumina paste of a consistency satisfactory for extrusion. The paste is extruded through a small die and the extrudate cut into short pellets. The catalyst pellets are dried and reduced with hydrogen at an elevated temperature as in the other embodiments of the invention.

Finally and preferred, another component may be added to the compositions of the above previously-described methods. It has been found that the addition of aqueous solutions containing a fluorine compound, such as hydrofluoric acid, ammonium fluoride, or $C_1$–$C_5$ fluorinated aliphatic acids, to the silica-alumina composition at any point prior to extrusion supplements and aids in the extrusion by altering the consistency of the material and making the same easier to extrude. The silica-alumina compositionsm ay also be impregnated with aluminum fluoride or zirconium fluoride by precipitation from an aqueous solution of a water-soluble aluminum or zirconium salt (such as the nitrate). Preferred catalysts prepared in accordance with this invention are those in which the metal promoter is present in the amount of 0.05–1.0% w. of the weight of the support and preferably in the range of 0.1–0.6% w. The amount of fluorine compound added to the catalyst (on the basis of fluorine content) is between 0.1 and 5.0% and preferably between 0.5 and 3.0%.

The following non-limiting examples demonstrate the scope of this invention and a preferred method of carrying out the novel process which we have discovered.

*Example I*

A quantity of silica-alumina hydrogel, containing 75% silica and 25% alumina (dry-weight basis), is prepared by acidification of an aqueous solution of sodium silicate with sulfuric acid. To the precipitated silica gel is added a solution of an aluminum salt, such as aluminum sulfate, which is then precipitated by the addition of aqueous ammonia. The hydrogel thus formed is filtered, ion-exchanged with ammonium chloride solution, and washed to remove objectionable sodium and sulfate ions. The filter cake is then divided into several portions and dried to different water contents for storage. One portion of the silica-alumina is dried to a water content of 10% w. A second portion is dried to a water content of 25% w., and a third portion dried to a water content of 50% w. Subsequently, the dried silica-alumina portions are mixed with water to produce a paste containing 55–60% w. water in preparation for extrusion in a high-pressure screw-extruder. The first sample, which is dried initially to 10% w. water content, extrudes with great difficulty and abrades the die badly. The extrudate is poor in quality, contains many fracture lines, and powders readily upon handling. The silica-alumina portions which are initially dried to 25% w. and 50% w., respectively, extrude easily and give extrudates which are cut into pellets and dried. These silica-alumina pellets are coherent and substantially free from fracture lines, and do not tend to powder or disintegrate. Catalyst pellets prepared in this manner are dried, calcined, treated with an aqueous solution of palladium chloride, dried, and activated by reduction with hydrogen at about 975° F. to produce a catalyst which is highly active for isomerization of normal paraffin hydrocarbons.

*Example II*

A quantity of silica-alumina hydrogel, containing 75% silica and 25% alumina, is precipitated by the procedure used in Example I. The resulting hydrogel is ion-exchanged and washed to remove undesired salts or ions. The purified hydrogel is re-slurried in an aqueous solution of a palladium salt, such as palladium chloride, and hydrogen sulfide is bubbled through the slurry to precipitate the palladium as palladium sulfide. The concentration of the palladium salt in the solution is adjusted so as to give a palladium content of 0.40% w., based on the final activated catalyst. The mass is filtered and separate portions of the filter cake are dried to water contents of 10% w., 25% w., and 50% w., respectively. When these catalyst portions are mixed with water to form a paste for extrusion of the catalyst, the portion which is dried to an initial water content of 10% w., or below, extrudes poorly and tends to abrade the die. The extrudate which is obtained from this material is of poor quality and tends to disintegrate upon handling. The portions of the treated silica-alumina which have been dried initially to water contents of 25% w. and 50% w., respectively, extrude easily when mixed with water to a water content of about 60% w. The extrudates which are obtained are cut into small pellets which, when dried, have a coherent structure free from fracture lines, and have no tendency to powder or disintegrate on handling. These catalyst pellets are activated by reduction with hydrogen at a temperature at about 975° F.

*Example III*

A quantity of silica-alumina, containing 75% w. silica and 25% w. alumina (dry-weight basis), was prepared as in Example I. Portions of this silica-alumina were dried from an initial water content of around 90% w. to 10% w., 25% w., and 50% w., respectively. These portions of silica-alumina were impregnated with a solution of palladium chloride in an aqueous hydrofluoric acid solution of a concentration such that the palladium content was 0.35% w. and the hydrogen fluoride content was 2% w., based upon the dried catalyst weight. The impregnation of the dried silica-alumina compositions was carried out in such a manner that the finished mass in each case was in the form of a thick paste (about 40% in excess of pore volume). These catalyst compositions were then dried to about 55–60% w. water content for extrusion in a high-pressure screw-type extruder. The first portion of silica-alumina, containing an initial water content of 10% w., was extruded only with great difficulty after several passes and repeated upward adjustment of water content. In each case, the quality of the extrudates was poor and pellets cut from the extrudate tended to pulverize and disintegrate upon handling. Samples of the silica-aluminas having initial water contents of 25% w. and 50% w., respectively, extruded easily and were cut into pellets which were coherent and free from fracture lines. These pellets did not tend to disintegrate or powder upon handling, and upon drying, calcining, and activation with hydrogen proved to be highly active as catalysts for the isomerization of normal paraffin hydrocarbons.

While we have described our invention fully and completely as required by the patent laws, with reference to preferred embodiments of the invention, we wish it understood that within the scope of the appended claims, this invention may be practiced otherwise than as specifically described.

What is claimed is:

1. A method of preparing an extruded catalyst support having high isomerization activity from a silica-alumina hydrogel, containing 50–95% wt. silica on a dry-weight basis, and which has been dried to a water content of 20–50% wt., but never below 20% wt., which consists of adding sufficent water, not less than about 5%, containing in solution a metal promoter for the catalyst, to said dried hydrogel to produce a smooth paste containing 50–65% wt. water, the water content of said paste varying substantially in direct proportion to the silica content of the hydrogel, extruding said paste through a die, cutting the extrudate into pellets, and drying and calcining the pellets.

2. A method of preparing an isomerization catalyst support which consists of precipitating a silica-alumina hydrogel, containing 50–95% wt. silica on a dry-weight basis, from solution, drying the hydrogel to a water content of 20–50% wt., but never below 20% wt., subsequently mixing the dried hydrogel with sufficient water, not less than about 5%, containing in solution a metal promoter for the catalyst, to produce a smooth paste containing 50–65% wt. water, the water content of said paste varying substantially in direct proportion to the silica content of the hydrogel, extruding the paste through a die, cutting the extrudate into pellets, and drying and calcining the pellets.

3. A method in accordance with claim 1 in which the added water contains in solution a fluorine compound of the group consisting of hydrogen fluoride, ammonium fluoride, and fluorinated $C_1$–$C_5$ aliphatic acids.

4. A method in accordance with claim 1 in which a compound of the group consisting of aluminum fluoride and zirconium fluoride is precipitated in the silica-alumina hydrogel.

5. A method in accordance with claim 2 in which the hydrogel is precipitated from a solution containing a compound of the group consisting of hydrogen fluoride, ammonium fluoride, and fluorinated $C_1$–$C_5$ aliphatic acids.

6. A method in accordance with claim 2 in which the added water contains in solution a compound of the group consisting of hydrogen fluoride, ammonium fluoride, and fluorinated $C_1$–$C_5$ aliphatic acids.

References Cited in the file of this patent

UNITED STATES PATENTS

| | | |
|---|---|---|
| 2,460,811 | Davies et al. | Feb. 8, 1949 |
| 2,604,662 | Bodkin | July 29, 1952 |
| 2,794,002 | Haensel et al. | May 28, 1957 |